Aug. 18, 1931.                R. R. CRUM                 1,819,357
                              UNDERREAMER
                       Filed April 2, 1928        2 Sheets-Sheet 1
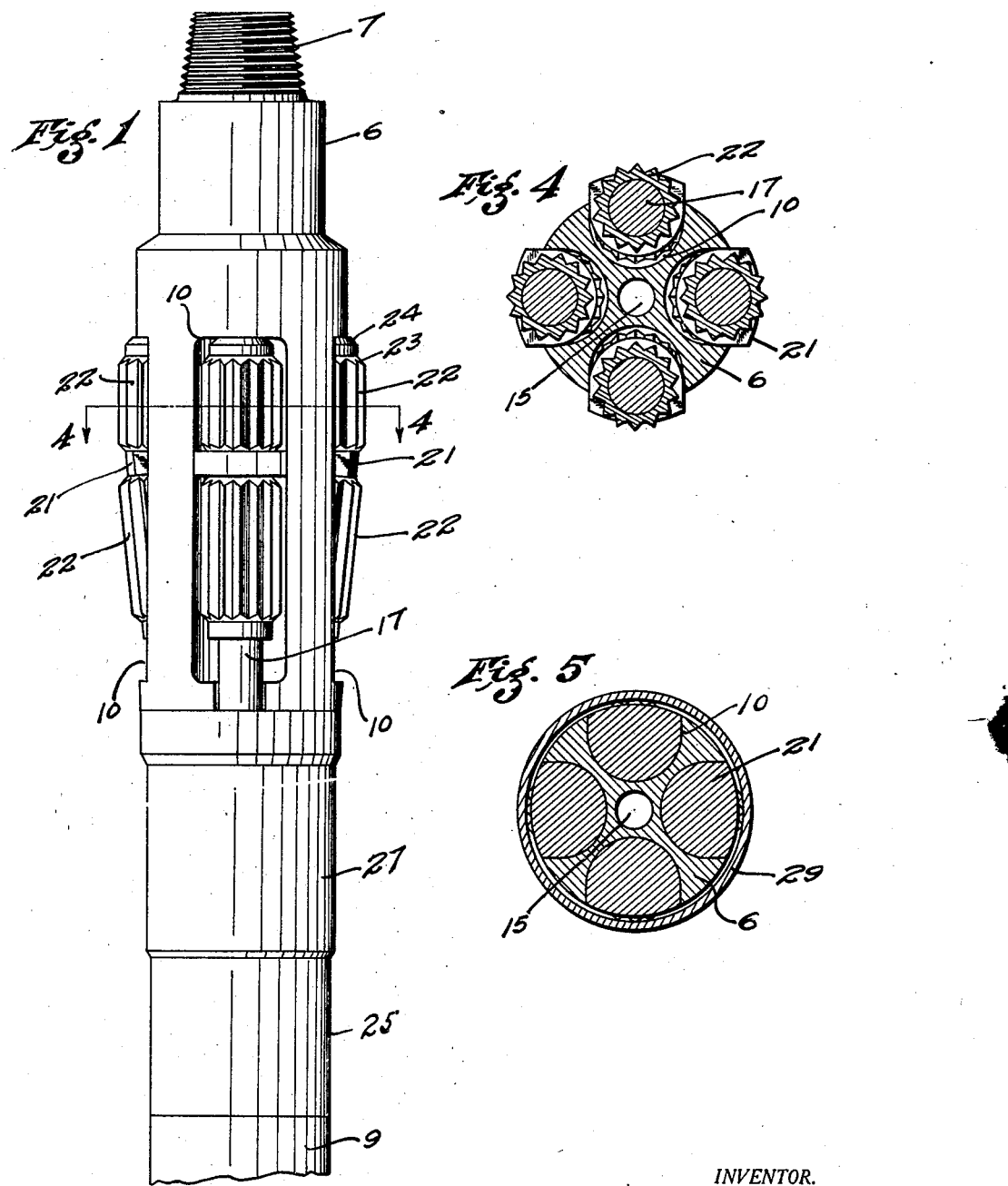
INVENTOR.
Roland R. Crum.
BY Westall and Wallace
ATTORNEY.

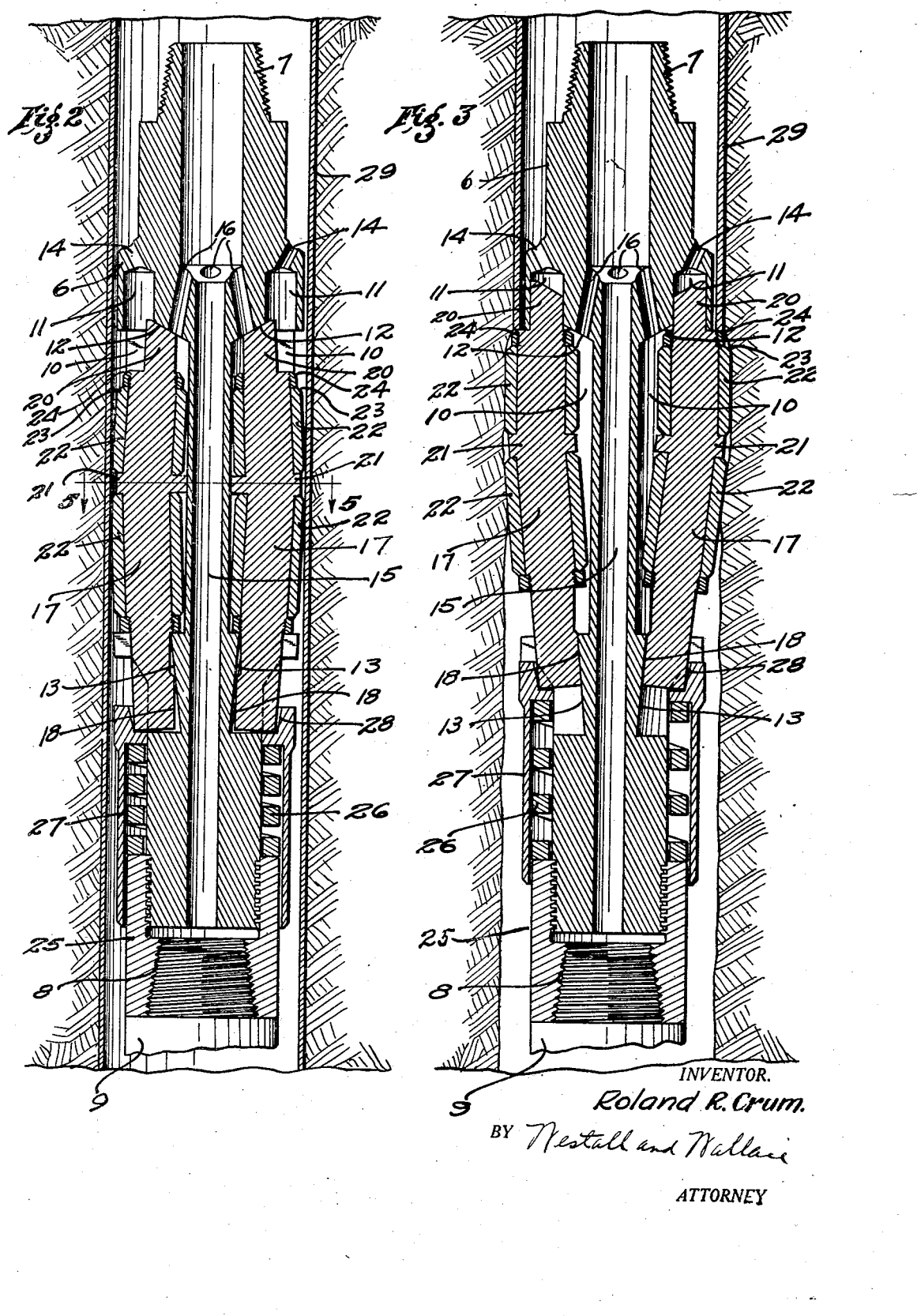

Patented Aug. 18, 1931

1,819,357

UNITED STATES PATENT OFFICE

ROLAND R. CRUM, OF WHITTIER, CALIFORNIA, ASSIGNOR, BY MESNE ASSIGNMENTS, TO JOHN GRANT, OF LOS ANGELES, CALIFORNIA

UNDERREAMER

Application filed April 2, 1928. Serial No. 266,553.

This invention relates to a collapsible underreamer having cutter devices which are projectable laterally into work engaging position. It appertains more particularly to an underreamer having cutter devices supported upon a body at the ends and longitudinally and laterally movable whereby to project and retract the cutters.

The objects of this invention are to provide a collapsible underreamer having any or all of the following features: a body with peripheral cutter accommodating cavities; cutter devices longitudinally and laterally movable in said cavities and bearing against said body; supporting surfaces for said cutter devices to positively hold them laterally in expanded position together with guide surfaces cooperating with said cutter devices to direct the latter into expanded position; and resiliently operated cutter actuating means on the body tending to move said cutters into expanded position; an underreamer of the character before mentioned having spindles carrying rotative cutters and certain of the bearing surfaces being in the form of sockets to receive corresponding ends of the spindles, the other ends being rockable so that the cutters may be swung inwardly and outwardly; and details of structure contributing to durability, simplicity, long life, strength and certainty of operation.

These objects are accomplished by means of the embodiment of my invention illustrated in the accompanying drawings, in which:—

Fig. 1 is an elevation of the complete underreamer, a fragment of the shank of a drilling tool being shown attached thereto and the cutters being in expanded position; Fig. 2 is an axial section through the tool within a casing, the underreamer being in collapsed position; Fig. 3 is an axial section showing the cutter devices below a casing and the underreamer in expanded position; Fig. 4 is a section as seen on the line 4—4 of Fig. 1; and Fig. 5 is a section as seen on the line 5—5 of Fig. 2.

Referring more particularly to the drawings, a body 6 of cylindrical form is shown having a threaded pin 7 at the upper end for attachment to a drill string and a threaded box 8 at the lower end to receive the pin of a drilling tool, a fragment of which is indicated by 9. It will be understood that other devices may be attached instead of the tool 9. Cutter accommodating cavities or coves 10 are provided in the periphery of the body. At the upper ends of the coves are recesses formed by sockets 11 to receive the upper ends of cutter spindles and cam surfaces 12 for directing the spindles into the sockets. At the lower end of the cavities are inclined bearing surfaces 13 for the spindles to rest thereagainst. Suitable vent holes 14 are formed in the sockets to prevent trapping of fluid therein. Extending through the body is a circulation passage 15 having water courses 16 for directing circulation fluid into the cavities.

There are four coves shown herein, but there may be more or less, and in each cove is a cutter comprising a spindle or cutter carrier 17. The lower ends of the spindles have bearing surfaces 18 for engagement with the corresponding bearing surfaces 13 on the body. These spindles are of such length that they may be moved longitudinally and in doing so will bear at their lower ends against the surfaces 13. In the upper position of the spindles the lower ends are moved a slight distance outwardly. The upper ends of the spindles form pin extensions 20, which will snugly fit into the sockets 11. The ends of the extensions are inclined in a direction corresponding to the cam surfaces 12. In collapsed position as shown in Fig. 2, the extensions are out of the sockets and their ends are engaged with the guide surfaces. In expanded position, the extensions, as shown in Fig. 3, are disposed in the sockets. The spindles comprise two journal sections meeting at a rib 21. Mounted upon the journal sections are rotative cutters 22 suitably held in position by end collars. The upper rollers on the spindles have bevelled or chamfered edges 23 and their collars bevelled edges 24.

A coupling sub 25 is secured to the lower end of the body and forms a part thereof. This sub provides a shoulder upon which a compression spring 26 may be mounted. Slidably mounted over the sub and body is an expander sleeve 27 arranged to have the compression spring bear against it.

Recesses 28 are formed by upstanding abutments on the sleeve so as to form seats or pockets for the lower ends of the spindles 17. The sleeve and compression spring form an expander tending to move the spindles upwardly.

The tool may be collapsed by forcing the cutter mechanism downwardly so that the extensions 20 are out of their sockets and the inclined faces of the spindles rest against the guide surfaces as shown in Fig. 20. In this condition, the underreamer is inserted in the casing marked 29 and may be lowered to reaming position. The casing serves to maintain the cutters in collapsed condition. When the tool has reached the position such that the cutters are below the lower end of the casing, the compression spring expands, forcing the expander sleeve upwardly and causing the inclined ends of the spindles to ride outwardly over the cam or alinement surfaces. When the pin extensions have reached registration with the sockets 11, they will slip therein and be in the position shown in Fig. 3. The outer sides of the sockets form retaining walls to hold the spindles against outward displacement. In this position they are positively held against lateral movement. To collapse the tool it is drawn upwardly so that the bevelled edges 24 of the washers engage the lower end of the casing. Further movement will cause the cutters and spindles to be moved longitudinally downward until the pin extensions 20 are out of their sockets. Thereupon, the bevelled face of the washers cause the spindles to be swung inwardly to engage the inclined cam surfaces, and the bevelled ends 23 of the upper rollers engage the lower end of the casing, causing further downward inward movement until the rollers ride within the casing.

What I claim is:—

In an expansive reamer, the combination of a body having longitudinally extending cutter receiving recesses in its medial portion and cutter receiving sockets at the upper ends of the recesses, the recesses at the sockets having diagonal cutter expanding faces leading to the sockets, longitudinally extending cutters in the recesses and adapted by longitudinal movement to enter their ends in the sockets, a spring surrounding the body below the recessed portion, a sleeve surrounding the body and spring and having a flanged head against which the spring presses upwardly, the lower ends of the cutters resting on the sleeve head and the sleeve head having a marginal flange projecting upwardly outside the cutter ends to confine them.

In witness that I claim the foregoing I have hereunto subscribed my name this 14th day of March, 1928.

ROLAND R. CRUM.